MICROWAVE PULSING CIRCUIT

Filed Nov. 10, 1958

INVENTORS
SOL BOLES
CHARLES R. KENNY
BY H. L. Mackey
ATTORNEY.

United States Patent Office 3,090,921
Patented May 21, 1963

3,090,921
MICROWAVE PULSING CIRCUIT

Sol Boles, Bronx, and Charles R. Kenny, Purdy's Station, N.Y., assignors to General Precision Inc., a corporation of Delaware Filed Nov. 10, 1958, Ser. No. 772,808
8 Claims. (Cl. 328—65)

This invention relates to modulation circuits and more specifically to circuits for pulse-modulating microwave generators.

Circuits for pulse-modulating microwave generators such as magnetrons and klystrons generally include an inductor and capacitor energized from a unidirectional source. An electronic tube, either high-vacuum or gaseous, is made alternately conductive and nonconductive by applying an alternating current to its input circuit. The operation of this tube causes the capacitor to transfer its charge to the microwave generator tube, causing it to generate bursts of microwave frequency, the bursts being at the pulse repetition frequency. A restorer tube is also required to restore the capacitor charge between pulses.

This circuit, although generally used, has several disadvantages. The components must be large enough to store or withstand the full power or potential of each pulse applied to the generator, and distributed capacitance prevents the rapid decay of the generated burst. For example, if it be desired to generate one-microsecond bursts of microwave energy separated by four-microsecond intervals, the disappearance of oscillatory energy within the magnetron may be so slow as to persist after a burst until the start of the next burst.

The present invention substitutes other components for the inductor, capacitor and restorer tube and connects them in an entirely different way so that they are required to handle, not the whole transmitting power, but only a much smaller switching power. These componets consist of a pulse transformer or phase inverting circuit, a switch tube and a pulse-clipping tube. Operation is positive and control of the microwave generating tube is complete, not only at the starting of the pulse or burst of microwave energy but also at its end, thus forcing almost instantaneous decay of the microwave burst and eliminating the slowly-decaying "tail."

The fundamental difference between this invention and other modulators is that the instant invention positively controls the magnetron or klystron at all times. During the pulse interval it applies power to the magnetron and during the interpulse interval it short-circuits the magnetron. Other circuits merely apply power during the pulse and do not attempt any control over the magnetron during the interpulse interval. A second difference between this and other circuits is the manner in which power is applied, namely, directly by an on-off electronic switch in series between the power and the magnetron instead, as in older circuits, by discharging a capacitor through the magnetron.

A purpose of the invention is to provide a microwave generator pulsing circuit which is simpler and uses smaller components than previous circuits.

Another purpose of the invention is to provide a microwave generator pulsing circuit which greatly shortens the pulse decay time.

A further understanding of this invention may be secured from the detailed description and drawings, in which.

Figure 1:
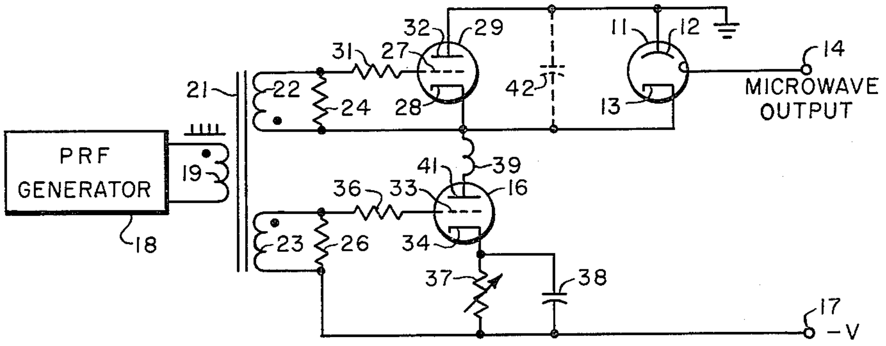
FIGURE 1 is a schematic diagram of an embodiment of the invention employing a pulse transformer to control the microwave generator tube.

Referring now to FIG. 1, a microwave generating tube 11 may be a magnetron or a klystron. In either case it has two electrodes, an anode 12 and a cathode 13, and has some of the characteristics of a diode load on the pulse-modulating circuit. Microwave energy is taken from a microwave output terminal 14. The anode 12 is grounded. The cathode 13 is connected through a series switch tube 16 to a constant negative-potential source of power applied to terminal 17. A pulse generator 18 generates, for example, rectangular positive pulses with a duty ratio of 20% at a pulse repetition frequency of 200 kilocycles per second. The pulses are then of one microsecond duration separated by four microsecond intervals.

These pulses are applied to the primary winding 19 of a pulse transformer 21 having two secondary windings 22 and 23. The winding polarities are designated by the dots near their ends. Each of the secondary windings 22 and 23 is shunted by a damping resistor 24 and 26 having such resistance as to critically damp the winding and thus to prevent shock-excited oscillation. The winding 22 is connected between the grid 27 and cathode 28 of a triode shunt switch tube 29, a protective resistor 31 being connected in series with grid 27 to limit grid current flow. The anode 32 of triode 29 is connected to the anode 12 of the microwave generating tube 11 and the cathode 28 is connected to the microwave generating tube cathode 13. Thus the tube 29 is connected directly in shunt with the microwave generator tube 11, and when conductive serves to short-circuit it, increasing its rate of decay.

The winding 23 of the pulse transformer 21 is connected between the grid 33 and cathode 34 of the switch tube 16. A protective resistor 36 to limit grid current is interposed in series with the grid. An adjustable cathode resistor 37 is inserted in series with the cathode 34 to provide adjustable self-bias as a means of adjusting the microwave generator tube direct-current flow. The resistor 37 may be shunted by the capacitor 38. This capacitor 38 steepens the rise of the pulse and at the same time, when the capacitor is small, it tends to smooth the top of the pulse waveform and to maintain constant pulse current. A small inductor 39 is inserted in series with the anode 41 of the switch tube 16. The purpose of this inductor is to limit current flow in the event that both tubes 29 and 16 are simultaneously conductive.

It is to be noted that the triodes 29 and 16, FIG. 1, both operate as electronic switch tubes. They are always operated simultaneously in opposite sense and therefore together function as a single-pole, double-throw electronic switch.

In the operation of the circuit of FIG. 1, positive pulses are applied to the transformer primary winding 19, the polarity being such that the dot-marked end of winding 19 becomes positive at the rise of the pulse. Simultaneously the dot-marked end of the secondary winding 22 becomes positive and the other end applies negative potential to grid 27 causing the shunting tube 29 to become completely nonconductive and to stay that way for the duration of the pulse. Thus for the duration of the pulse the microwave generating tube 12 is completely unshunted.

The dot-marked end of secondary winding 23 becomes positive at the time of the pulse rise, applying a relatively high positive potential to grid 33 of the switch tube 16. This makes this triode highly conductive, applying the negative potential of terminal 17 to the cathode 13 of the microwave generating tube 11. This tube immediately commences oscillation at its microwave frequency and maintains oscillation for the duration of the pulse, emitting the microwave power at output terminal 14.

At the end of the pulse the power of generator 18 is no longer applied to the primary winding 19. The induced potentials disappear from the secondary windings 22 and 23 and their collapsing fields effectively reverse the potentials applied by them to the grids of tubes 29 and 16. This effect is advantageously augmented by reversing the potential applied to the primary winding 19 at the end of a pulse instead of merely removing the potential. In either mode of operation triode 16 is made nonconductive, terminating the power supply to the microwave generating tube 11. Also triode 29 is made highly conductive. This applies a very low resistance short-circuit across the microwave generating tube 11, reducing its supply voltage and abruptly terminating its microwave oscillation. The mechanism by which this occurs includes the provision of a good path for the discharge of the distributed shunt capacitance of tube and wiring indicated by the dotted capacitor 42.

Figure 2:
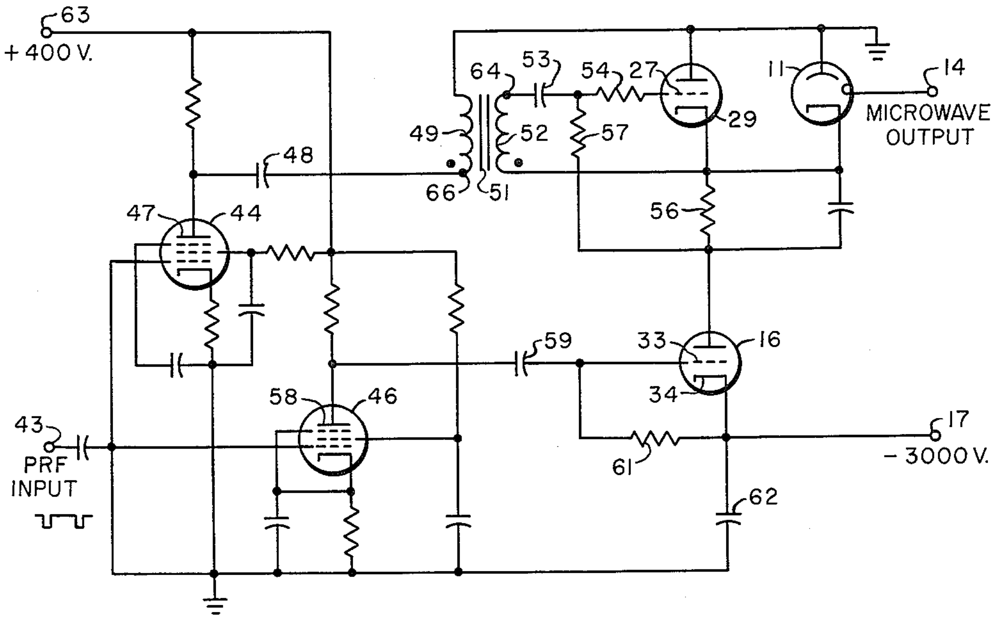
FIGURE 2 is a schematic diagram of an embodiment of the invention in which control of the microwave generator tube during the pulse interval takes place through capacitive coupling but during the interpulse interval takes place through a pulse transformer.

A circuit which does not require the special pulse transformer of FIG. 1 but employs a single two-winding pulse transformer is shown in FIG. 2. The pulsing power is applied from terminal 43 to the control grids of two pentode amplifiers 44 and 46. The anode 47 of pentode tube 44 is coupled through a capacitor 48 to the primary winding 49 of a pulse transformer 51, and from its secondary winding 52 the induced potential is coupled through a capacitor 53 to resistor 54 and to the control grid 27 of shunting tube 29. This tube 29 is connected in shunt with the microwave generator tube 11. A by-passed cathode resistor 56 and grid resistor 57 are provided. One purpose of this cathode resistor 56 is to eliminate harmful current surges in the event that tubes 29 and 16 are both conductive at the same time.

The anode 58 of pentode 46 is coupled through capacitor 59 to the grid 33 of switch tube 16. Grid 33 and cathode 34 are connected through a grid resistor 61. The high negative potential terminal 17 is connected to cathode 34 and provided with a smoothing capacitor 62. Reasonable potential values are, for example, −3000 volts supplied at terminal 17 and +400 volts at terminal 63 as anode supply for the pentode amplifiers.

In the operation of the circuit of FIG. 2, negative pulses applied from the pulse generator to terminal 43 are inverted and amplified by pentode 44. They are differentiated by capacitor 48, which together with its discharge resistance has a short time constant. The resulting spiked pulses are transmitted through the pulse transformer 51. The secondary winding 52 thereof is so poled, as indicated by the black dots at the winding terminals, that at the time of the forward edge of the pulse applied to terminal 43 a negative spike or sharp pulse is formed at the end terminal 64 of winding 52. This makes grid 27 negative and causes tube 29 to be nonconductive.

At the same time the negative pulse at terminal 43 is amplified and inverted by pentode 46 and is coupled through capacitor 59 to grid 33, making it positive and making tube 16 highly conductive. The differentiating effect of capacitor 59 is negligible because of the large time constant of its discharge circuit. When switch tube 16 becomes conductive it applies the potential from terminal 17 to microwave generator tube 11. Since this current passes through resistor 56, a potential drop is generated across it which applies negative bias to grid 27, holding triode 29 nonconductive for the duration of the pulse.

At the time of decay of the input pulse at terminal 43 the grid 33 becomes negative and tube 16 nonconductive. At the same time the trailing edge of the input pulse is inverted and differentiated to apply a negative spike of potential to the end terminal 66 of winding 49. This results in a positive spike of potential at the grid 27 causing the shunting tube 29 to become highly conductive and heavily shunting the generator 11 just at the time of pulse decay. This effectively eliminates the "tail" or slowly decaying fall of the microwave pulse output at terminal 14.

It is to be noted that the amplifying pentodes 44 and 46 are not essential to the operation of the circuit of FIG. 2 although in practice they have been found desirable. This circuit is operable if these pentodes 44 and 46 be omitted and positive pulses be substituted for negative pulses at the input terminal 43. This terminal is connected directly to capacitors 48 and 59, employing appropriate capacitor discharge paths.

What is claimed is:

1. A pulse-modulating circuit for a microwave generator comprising, a source of pulse signals, phase-splitting means actuated thereby and simultaneously emitting two output signals having opposite phases, a first variable impedance connected in shunt with the anode-cathode circuit of a microwave generator, a second variable impedance connected in series with the anode-cathode circuit of said microwave generator, a source of direct-current power connected to said second variable impedance, coupling means applying one of said two output signals to control said first variable impedance, and coupling means applying the other of said two output signals to control said second variable impedance.

2. A microwave pulsing circuit comprising, a microwave generating tube having anode and cathode, a source of modulating pulses, phase-splitting means actuated from said source of modulating pulses and having two output terminals simultaneously emitting potentials of opposite phases, shunt variable impedance means connected to said anode and cathode, a series variable impedance connected in series between the anode-cathode circuit of said microwave generating tube and a source of potential, means connecting said shunt variable impedance means for control of the impedance thereof from said one output terminal of the phase-splitting means, and means connecting said series variable impedance means for control of the impedance thereof from said other output terminal of the phase-splitting means.

3. A mcrowave pulsing circuit comprising, a microwave generating tube having a grounded anode and a cathode, a modulating pulse generator, phase-splitting means connected to said modulating pulse generator for actuation thereby, said phase-splitting means having a first output terminal emitting modulating pulses at such phase relative to those emitted by said modulating pulse generator as to be positive in potential during the pulses, a second output terminal simultaneously emitting modulating pulses at phase opposite to those emitted by said first output terminal, an electronic shunt tube having at least an anode, cathode and control grid, a connection from said shunt tube anode to said microwave generating tube anode, a connection from said shunt tube cathode to said microwave generating tube cathode, a connection from said second output terminal of the phase-splitting means to said control grid of the shunt tube, an electronic series switch tube having at least anode, cathode and control grid, means connecting the anode thereof to said cathode of the microwave generating tube, a connection from the cathode of said series switch tube to a source of negative continuous potential, and a connection from said first output terminal of the phase-splitting means to the control grid of said series switch tube.

4. A microwave pulsing circuit in accordance with claim 3 in which said phase-splitting means is a pulse transformer.

5. A microwave pulsing circuit in accordance with claim 3 in which said phase-splitting means comprises a pulse transformer one secondary terminal of which constitutes said second output terminal, and in which said phase-splitting means first output terminal is capacitively coupled to said modulating pulse generator.

6. A microwave pulsing circuit comprising, a microwave generating tube having an anode and cathode, a pulse generator, a pulse transformer having a primary winding and two secondary windings, means connecting said primary winding to said pulse generator for energization thereby, a shunt triode having an anode, cathode and control grid, a connection from said triode anode to said generating tube anode, a connection from said triode cathode to said generating tube cathode, means connecting one of said secondary windings between said shunt triode cathode and control grid, a series triode having an anode, cathode and control grid, a source of direct potential, means connecting the negative terminal thereof to said series triode cathode, means connecting the more positive terminal thereof to said generating tube anode, means connecting said series triode anode to said generating tube cathode, and means connecting the other of said secondary windings between said series triode control grid and cathode, the instantaneous polarization of the grid end of said other secondary winding being the same as the polariaztion of the cathode end of said one secondary winding.

7. A microwave pulsing circuit comprising, a microwave generating tube having a grounded anode and a cathode, a modulating pulse generator, a shunt triode having anode and cathode electrodes connected to said generating tube anode and cathode respectively and having a grid, a series triode having anode, cathode and grid electrodes, a grounded source of negative potential connected to the cathode thereof, means connecting the cathode of said shunt triode to the anode of said series triode, a pulse transformer excited from said pulse generator, means coupling said pulse generator to the grid of said series triode, and means connecting said pulse transformer to the grid of said shunt triode, the pulse transformer being so poled as to apply negative potential to the grid of said shunt triode at the time that said pulse generator applies a positive pulse to the grid of said series triode, and to apply positive potential to the grid of said shunt triode at the time that said pulse generator applies a negative pulse to the grid of said series triode.

8. A microwave pulsing circuit comprising, a microwave generating tube having an anode and a cathode, a pulse generator emitting negative pulses, an inverting amplifier excited thereby, a differentiating circuit having a time period short relative to the interpulse interval, a connection from said amplifier output exciting said inverting amplifier, a two-winding pulse transformer, a connection from said differentiating circuit applying differentiated spiked pulses to one winding of said pulse transformer, a triode having anode, cathode and control grid electrodes, a connection from the other winding of said pulse transformer to said control grid, the winding polarization being such that at the time of the trailing pulse edge emitted from said pulse generator a positive spiked pulse is transmitted to said control grid, a connection from said triode anode to said generating tube anode, a connection from said triode cathode to said generating tube cathode and to one end terminal of a resistor shunted by a capacitor, a second inverting amplifier also excited by said pulse generator, a series triode having anode, cathode and control grid, a connection from the anode thereof to the other end terminal of said resistor, a source of negative potential connected to the cathode of said second triode with return to the anode of said generating tube, and long time constant capacitive means coupling the output of said second inverting amplifier to the control grid of said second triode.

References Cited in the file of this patent

UNITED STATES PATENTS

| | | |
|---|---|---|
| 2,596,142 | Gerwin | May 13, 1952 |
| 2,633,528 | Hutson | Mar. 31, 1953 |
| 2,698,900 | Anger | Jan. 4, 1955 |
| 2,748,316 | Stevenson | May 29, 1956 |
| 2,754,419 | Wideroe | July 10, 1956 |
| 2,817,817 | Albert | Dec. 24, 1957 |
| 2,830,178 | White | Apr. 8, 1958 |
| 2,837,645 | Siedband | June 3, 1958 |
| 2,903,583 | Hasley | Sept. 8, 1959 |
| 2,904,684 | Begeman | Sept. 15, 1959 |
| 2,941,125 | Lippincott | June 14, 1960 |

FOREIGN PATENTS

| | | |
|---|---|---|
| 748,508 | Great Britain | May 2, 1956 |